April 28, 1953  J. J. EVANS  2,636,694
TAPE RULER
Filed April 12, 1950
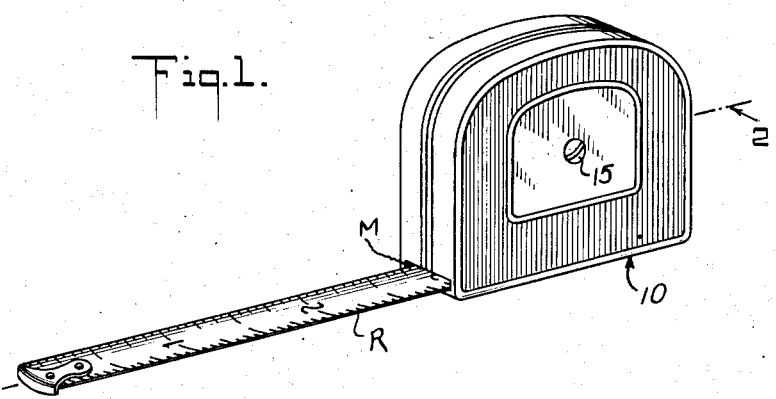
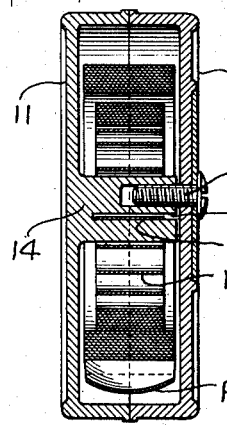
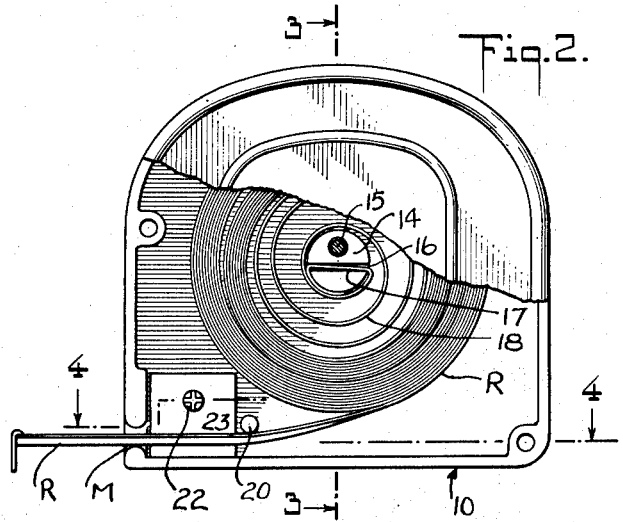
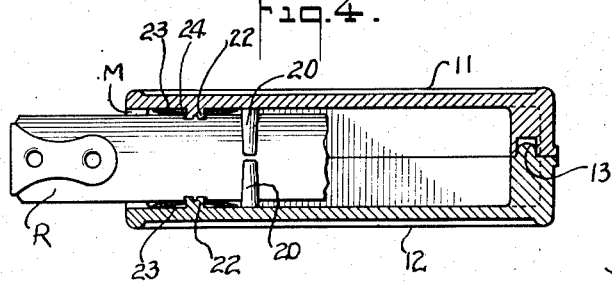
INVENTOR
John J. Evans
BY
ATTORNEY Patented Apr. 28, 1953

2,636,694

UNITED STATES PATENT OFFICE 2,636,694

TAPE RULER

John Joseph Evans, Union, N. J., assignor to Evans & Co. Inc., Newark, N. J., a corporation of New Jersey Application April 12, 1950, Serial No. 155,440

6 Claims. (Cl. 242—84.9)

This invention relates to a steel tape ruler of that type embodying a casing within which is wound a steel tape carrying measuring indicia. Rulers of the particular class are usually formed of thin steel tape and are concave-convex in section to contribute strength thereto. Furthermore, the particular section contributes to the tape a natural tendency to assume a straight rod-like form as it is withdrawn from the casing within which it is wound. As a general rule, one end of the tape is secured to a coiled spring, and the resilience of the tape and the resilience of the spring are such that the tape will normally be balanced in any position relatively to the casing into which it may be placed. The ruler then becomes known as a push-pull ruler, and when the ruler tape is pulled out of the casing to a particular point, it will tend to remain in equilibrium at that point.

However, it is very difficult to maintain steel tape rules in equilibrium, and for that reason the prior art has resorted to many devices for yieldingly holding the tape in a particular position. However, so far as I know, such devices have not been successful, even though in many cases they have contributed to an increase in the cost of the steel tape ruler assembly.

As a feature of my invention I contribute a ruler assembly of the class described in which extremely simple means are relied upon to maintain the steel tape in a state of equilibrium in any position to which it is moved, the means I use for the particular purpose deepnding for their action on the inherent nature of the steel tape and its normal form and section.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a perspective view of the ruler assembly of my invention showing a small part of the ruler tape outwardly of the casing. Fig. 2 is a section taken along lines 2—2 of Fig. 1, while Fig. 3 is a section taken along lines 3—3 of Fig. 2. Fig. 4 is a section taken along lines 4—4 of Fig. 2.

Referring now more particularly to the drawings, the casing of my ruler is designated generally by reference numeral 10 and is formed of two casing halves 11 and 12 doweled for suitable assembly as indicated at 13 in Fig. 4. A central abutment 14 extends upwardly in the casing half 11 and is threaded for a holding screw 15 extending inwardly from the casing half 12, it being the function of the screw 15 to maintain the two casing halves in doweled assembled relation.

The abutment 14 is slotted as at 16 for the inner end 17 of a spring 18. The spring 18 is coiled about the axis of the abutment 14, and at its outer end is secured to the end of a steel ruler tape R in a conventional manner as is well set forth in the prior art.

As earlier outlined, the ruler R is concave-convex in section and is guided for movement outwardly of the casing by a pair of opposed guide pins 20, as probably best illustrated in Figs. 2 and 4, the mouth of the casing being itself designated by reference letter M.

For stabilizing the ruler tape R in any position outwardly of the mouth M of the casing into which it may be moved, as for example the position in Fig. 4, I utilize those parts of my invention now to be described in detail. Thus, as is best shown in Figs. 2 and 4, each of the casing halves 11 and 12 is formed with an integral lug 22 extending inwardly in the general direction of the guide pins 20. Each lug 22 is adapted to receive a thin bowed spring plate or disc 23 formed with an opening 24 adapted to fit over the lug 22. Once a spring plate 23 is fitted over a lug 22, the lug is staked as is best seen in Fig. 4, so as to maintain the plate 23 securely assembled thereto. The convex side of each of the thin plates 23 faces in the direction of an edge of the ruler R, and the relationship of the parts is such that the convex surfaces will bear against the opposing edges of the ruler R with the pressure of the contact being of sufficient magnitude to hold the ruler R outwardly of the casing 10 in any position to which it may be pulled or pushed.

The pressure exerted by the thin bowed disks or plates 23 is such, however, as to be readily overcome, and will not resist too greatly the sliding of the ruler R, once a particular sliding motion thereof is initiated. Further, the action of the disks 23 is inherent therein, because of the shape of the said disks, and because of the natural cross-sectional shape of the ruler R.

Thus, the disks, through their pressure against the ruler R, actually tend to develop greater curvature in the ruler R so that the frictional pressure between the ruler R and the disks is the cumulative result of both the natural resilience of the ruler R and the disks 23.

I now claim:

1. In a combination of the class described, a casing formed of two mating halves, a sheet metal ruler tape, means on one of said casing halves about which said tape is coiled within said casing, said casing having a mouth through which the tape enters and leaves said casing as it winds and unwinds relatively to said means about which it coils in said casing, a yielding disc, and means integral with one of said casing halves positioned at said mouth and to which said yielding disc is secured in yielding contact with an edge of the said tape.

2. In a combination of the class described, a casing, a sheet metal ruler tape, means in said casing about which said tape is coiled within said casing, said casing having a mouth through which the tape enters and leaves said casing as it winds and unwinds relatively to said means about which it coils in said casing, a yielding member for contacting each of the edges of said tape, and means securing one of said yielding members at each side of said mouth in yielding contact with the edges of the said tape.

3. In a combination of the class described, a casing having side walls, a sheet metal ruler tape, means in said casing about which said tape is coiled within said casing, said casing having a slotted mouth extending between said side walls through which the tape enters and leaves said casing as it winds and unwinds relatively to said means about which it coils in said casing, and a thin springy convex metal plate positioned in juxtaposed relation to one of said side walls at one end of said slotted mouth in yielding contact with the edge of said tape.

4. In a combination of the class described, a casing having opposed side walls, a sheet metal ruler tape, support means in said casing extending between said walls about which said tape is coiled within said casing, said casing having an end wall transverse to said side walls and formed with a mouth through which the tape enters and leaves said casing as it winds and unwinds relatively to said support means, a lug formed on one of said opposed side walls adjacent said mouth, and a yielding springy member secured to said lug in yielding contact with an edge of the said tape.

5. In a combination of the class described, a casing having opposed side walls, a sheet metal ruler tape, support means in said casing extending between said walls about which said tape is coiled within said casing, said casing having an end wall transverse to said side walls and formed with a mouth through which the tape enters and leaves said casing as it winds and unwinds relatively to said support means, and a thin springy convex plate secured to each of said side walls with its convex side in yielding contact with an edge of said tape.

6. In a combination of the class described, a casing having opposed side walls, a sheet metal ruler tape, support means in said casing extending between said walls about which said tape is coiled within said casing, said casing having an end wall transverse to said side walls and formed with a mouth through which the tape enters and leaves said casing as it winds and unwinds relatively to said support means, and a thin springy convex plate secured to each of said side walls in yielding contact with an edge of said tape.

JOHN JOSEPH EVANS.

References Cited in the file of this patent

UNITED STATES PATENTS

| Number | Name | Date |
| --- | --- | --- |
| 618,050 | Barnes | Jan. 24, 1899 |
| 1,638,226 | Witchger | Aug. 9, 1927 |
| 1,804,975 | Eisenstein | May 12, 1931 |
| 2,110,210 | Evans | Mar. 8, 1938 |
| 2,132,202 | Carlson | Oct. 4, 1938 |